J. D. HUFFMAN.
Broadcast Seeders.

No. 138,403.  Patented April 29, 1873.

Attest:
J. W. Wagner.
H. M. Phillips.

Inventor:
J. Dean Huffman
By Johnson, Maucke &c.
his Attorneys

UNITED STATES PATENT OFFICE.

J. DEAN HUFFMAN, OF LONDON, OHIO, ASSIGNOR OF ONE-HALF HIS RIGHT TO C. M. THOMPSON, OF SAME PLACE.

IMPROVEMENT IN BROADCAST-SEEDERS.

Specification forming part of Letters Patent No. 138,403, dated April 29, 1873; application filed February 12, 1873.

*To all whom it may concern:*

Be it known that I, J. DEAN HUFFMAN, of London, in the county of Madison and State of Ohio, have invented certain new and useful Improvements in Broadcast Seed-Sowers, of which the following is a specification:

My invention relates to broadcast-sowers; and my improvements therein consist of a fixed hopper suspended upon a fixed spindle, and with its lower neck telescoping with a revolving seed receiving and distributing chamber, supported by the same stem by which the hopper is held in place, so as to form a cheap and compact device for the purpose seated upon the breast-board, the periphery of said seed-chamber forming also the driving-pulley, as hereinafter more fully set forth; also, in the arrangement of a wire-armed collar-bearing within the seed receiving and distributing chamber, for a support not only to the distributer with reference to its axis, but also as stirrers to break up any clots in the seed and to facilitate their delivery into the discharging-arms.

Figure 1:
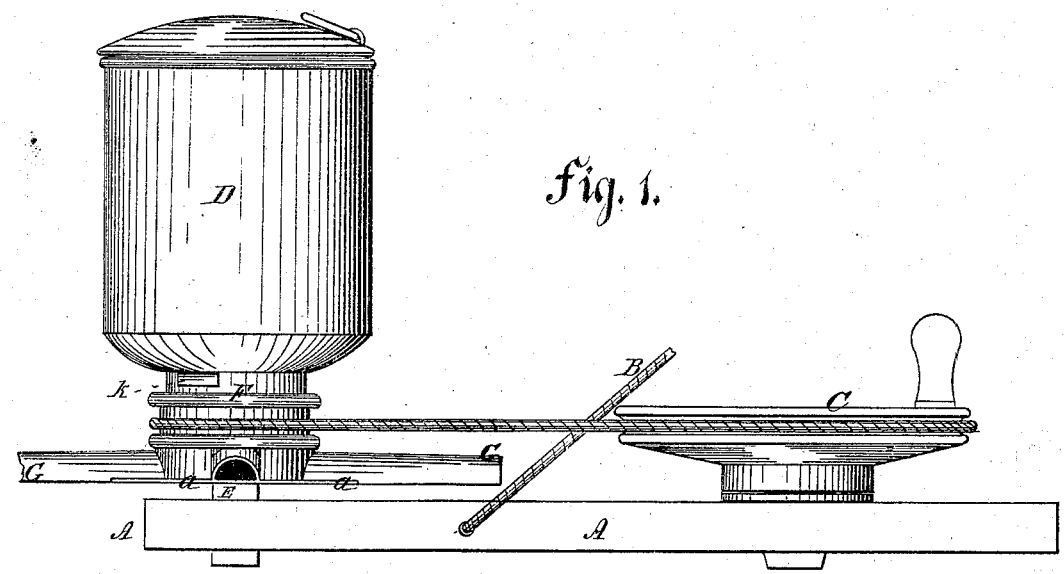
Figure 2:
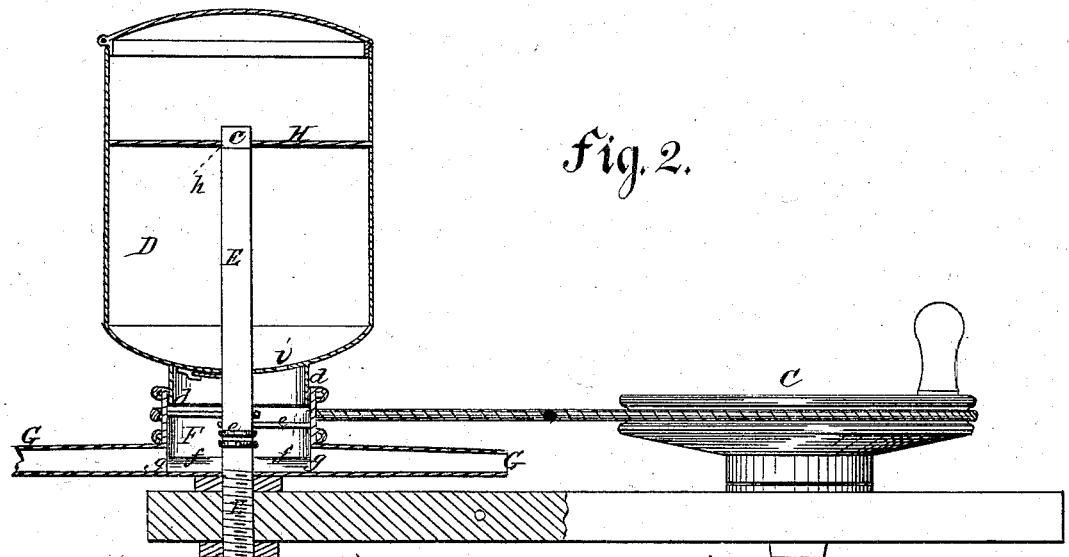
Figure 3:
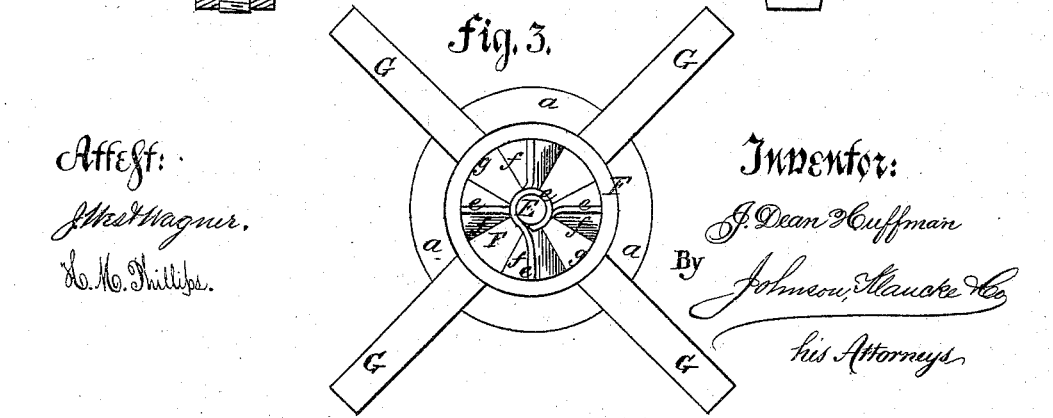

In the accompanying drawing, Figure 1 represents an elevation of a broadcast seed-sower embracing my invention. Fig. 2 represents a vertical longitudinal section thereof; and Fig. 3 represents a top view of the seed-distributer, showing the inclines and stirring-arms of the interior receiving and discharging-chamber.

The breast-board A of the sower is made to conform to the breast of the operator, and is provided with a supporting cord or strap, B, which rests upon the shoulders. A crank-driving pulley, C, on the inner end communicates motion to the distributing apparatus upon the outer end of the board. The distributing apparatus consists of a hopper or seed-receptacle, D, which is held stationary, as will be presently described. Immediately below the hopper and revolving upon a fixed-axis stem, E, is the receiving and discharging chamber F, rising from a circular disk, a, and provided with four or more discharging-spouts, G, from which the seed issues. This chamber F is grooved upon its periphery to receive the cord from the crank-pulley C, and thus acts as the driving-pulley of the distributing apparatus. Projecting from the bottom of said chamber are radially-inclined projections or ribs $f$, which serve, by means of the centrifugal force of the revolving chamber, to direct the exit of the seed into the receiving-mouths $g$ of the discharging-spouts. Embracing the axis-stem E are wire collar-bearings $e$, which serve to steady the position of the distributer upon its axis, and have also the very important function of stirrers, to break up any clots or masses of seed. The hopper D is perforated by the axis-stem E, which, being square-shouldered at $c$, rises through a slot, $h$, in a cross-bar, H, and thus serves to suspend and lock the hopper to said stem. The neck $d$ of the hopper fits within the receiving and discharging chamber F, and in this manner the chamber acts as a guide-sleeve to the hopper. The exit for the seed from the hopper to the chamber F is through a small hole, $i$, in its bottom, which is opened and closed by a cut-off slide, $k$, beneath the hopper. It will be observed, however, that the outlet $i$ for the seed from the fixed hopper D is arranged next to the body of the carrier, and the seed passing into the revolving-chamber is carried forward and forced out at the front and sides as the arms revolve, thereby preventing, in a great degree, the discharge of the seed against the body of the carrier, which in broadcast-sowers is an important advantage.

The operation of the above-described improvement is obvious from the description.

Having described my invention, I claim—

1. The fixed hopper D suspended upon a fixed stem, E, and with its neck telescoping with a revolving seed receiving and distributing chamber F, supported by the same stem E, from which the hopper is suspended, the periphery of said chamber forming the driving-pulley, as and for the purpose described.

2. The wire-armed collar-bearings $e$ for steadying the motion of the chamber F, to serve as stirrers, and assist in discharging the seed, as described.

J. DEAN HUFFMAN.

Witnesses:
E. McCORMACK,
LEONARD EASTMAN.